Nov. 22, 1966 — E. A. NOWAK — 3,286,626
SCREEN DECORATING METHOD
Filed June 5, 1964 — 3 Sheets-Sheet 1

INVENTOR.
EDWARD A. NOWAK
BY
ATTORNEYS

Nov. 22, 1966  E. A. NOWAK  3,286,626
SCREEN DECORATING METHOD
Filed June 5, 1964  3 Sheets-Sheet 2
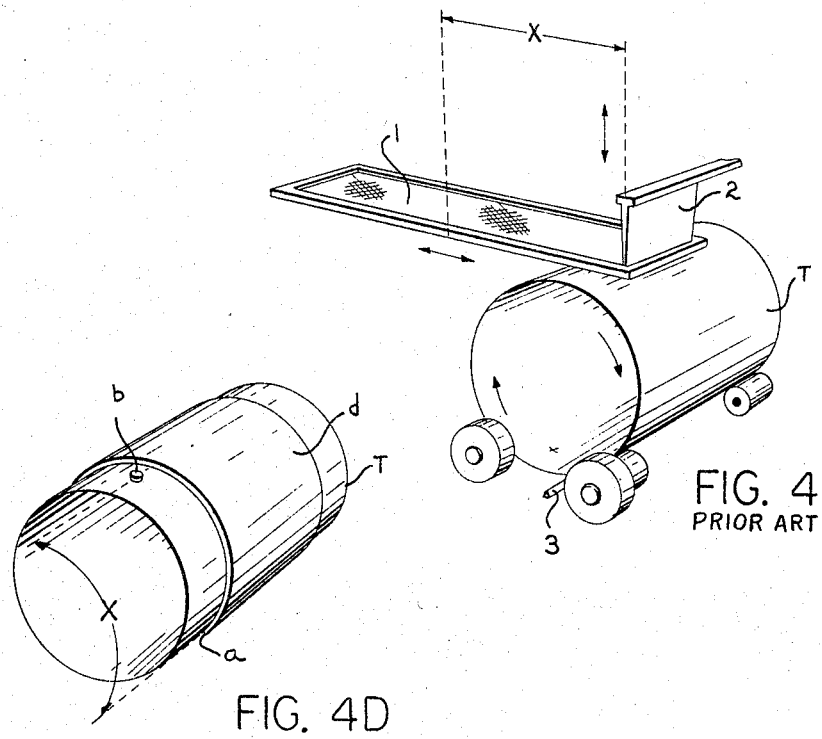
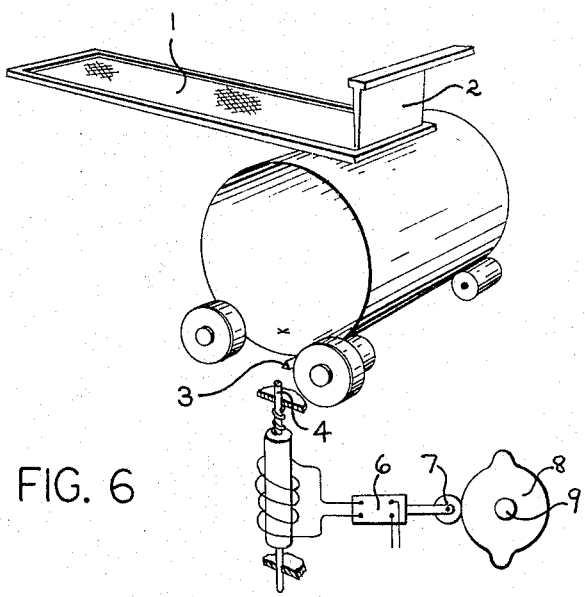
INVENTOR.
EDWARD A. NOWAK
BY
ATTORNEYS

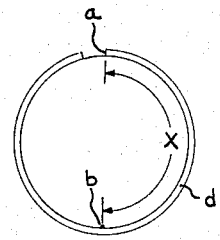
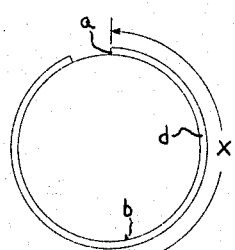
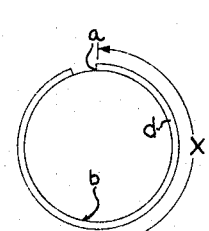
FIG. 4A    FIG. 4B    FIG. 4C
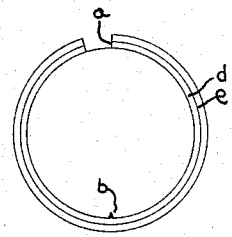
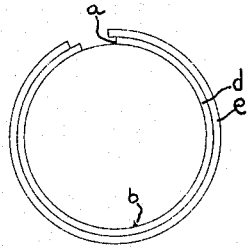
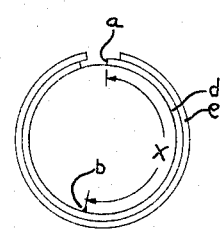
FIG. 5A    FIG. 5B    FIG. 5C
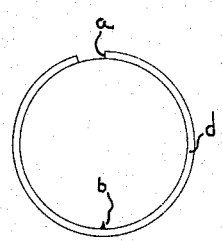
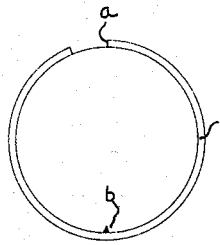
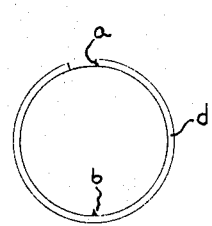
FIG. 6A    FIG. 6B    FIG. 6C
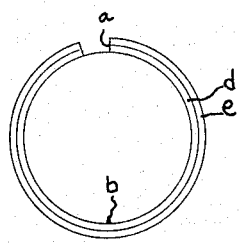
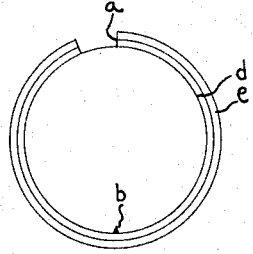
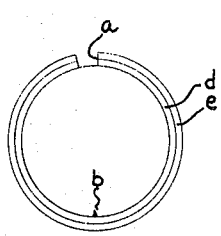
FIG. 7A    FIG. 7B    FIG. 7C

United States Patent Office 3,286,626
Patented Nov. 22, 1966

3,286,626
SCREEN DECORATING METHOD
Edward A. Nowak, Toledo, Ohio, assignor to Owens-Illinois, Inc., a corporation of Ohio
Filed June 5, 1964, Ser. No. 372,871
3 Claims. (Cl. 101—129)

This invention relates to a method for applying successive registered screen recorations to plural articles.

More particularly, this invention relates to a method for providing better registration of successive decorations to glassware such as tumblers, when screen decorating machines of the type such as that disclosed in U.S. Patent No. 2,304,725 to T. S. Bauman are used. Screening or stencilling machines of the type disclosed in the above-referred-to Bauman patent operate by the alternate swinging of a screen in a short horizontal arc in contact with the glassware to be decorated. The first article is decorated with the screen moving in one direction and the next article is screened by the reverse movement of the screen. Thus it can be seen that the term "two-way screen decorating machine" is appropriate in describing such a machine.

It is common practice in this decorating system to use a single machine for applying the first decoration to a plurality of articles, with the screen applying a so-called registering spot (see FIG. 4D) on the ware at the time the screening takes place and this registering spot is then used in relation to subsequent machines of the same type which apply additional colors or designs to the articles. One common failing in this system is that the registration of ware with respect to the successive screening is dependent upon the skill of the operator in placing the ware in particular orientation with respect to the screen so that the second decoration will be applied to the ware in proper alignment with the first decoration.

It should be readily appreciated that articles such as glass tumblers which are produced in a "paste mold" process have variations in height and diameter inherent in the process by which they are made. Furthermore, in tapered ware where the decoration is applied a fixed distance from the top of the ware the diameter of successively produced pieces is extremely difficult to predict due to the variations in finished height.

It can readily be seen that when ware is screened by the movement of the screen from right to left, subsequent decoration of the same piece of ware by screening of a decorating machine which is in the attitude preparatory to screening from left to right will invariably result in misregistered decorations. Only in ideal situations would the registration be within acceptable limits, the ideal situation being where the glassware is of a predetermined diameter in relation to the length of the stencil used in the screening operation (see FIGS. 4A and 5A.)

As pointed out above, ideal sized glassware is not the rule and variations from an ideal situation is the accepted condition.

With the foregoing in view, it is an object of this invention to provide a method of applying plural decorations to articles wherein the decorations are always in registry.

It is an additional object of this invention to provide a method of segregating the ware as it moves from one decorating machine to another in such a manner that the machine operators are cognizant of the direction of the rotation of the ware during the previous screening.

It is a further object of this invention to provide a method of applying plural screen decorations to glassware in which it is assured that each successive screen decoration applied to any individual piece of ware will always be applied through rotation of the ware in the same direction.

Other and further objects will be apparent from the following description taken in conjunction with the annexed sheets of drawings, wherein:

FIG. 4 is a schematic, perspective view of the screen, squeegee and tumbler support presently used in screen decorating;

FIG. 4A is a schematic illustration of an ideal size tumbler with the first decoration applied;

FIG. 4B is a schematic view similar to FIG. 4A showing a "larger-than-ideal" size tumbler with the first decoration applied;

FIG. 4C is a schematic view similar to FIG. 4A showing a "smaller-than-ideal" size tumbler with the first decoration applied;

FIG. 4D is a schematic perspective view of a tumbler with the first screen decoration applied in the apparatus of FIG. 4;

FIG. 5A is a schematic view of the tumbler of FIG. 4A showing the second screen decoration applied thereto;

FIG. 5B is a schematic view of the tumbler of FIG. 4B showing the second screen decoration applied thereto;

FIG. 5C is a schematic view of the tumbler of FIG. 4C showing the second screen decoration applied thereto;

FIG. 6 is a schematic perspective view of a decorating screen, squeegee, tumbler support and registering mark applying system of the invention;

Figure 1:
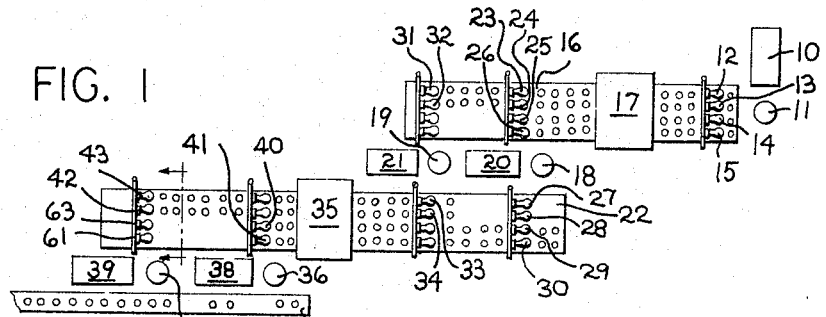
FIG. 1 is a top plan view of a screen decorating shop in which three successive screen decorations are applied to glassware.

FIGS. 6A, 6B and 6C are schematic views of ideal, large and small size tumblers respectively, decorated in the system of FIG. 6 showing the location of the separately applied registering dot; and, FIGS. 7A, 7B and 7C are schematic views of the same tumblers of FIGS. 6A, 6B and 6C respectively, after the second screen decoration has been applied thereto illustrating the precise registration accomplished by the invention.

Presently, in multi-screening decorating applications where the screen drives the ware by frictional contact therewith, the ware is screened in two or more machines and the applications are expected to register with one another. A dot or registering mark is printed by the first screen operation. This method is illustrated in FIGS. 4 and 4D. With reference to these two figures, it can be seen that in the first screen decoration application the screen 1 and its squeegee 2 are in position to begin a screening operation when the screen is moved from left to right. The squeegee remains stationary in contact with the screen 1 and the tumbler T is rotated, as indicated by the arrows thereon. With reference to FIG. 4D a decorated glass tumbler is shown with the leading edge of the decoration being at $a$. The dot or registering mark $b$ is shown applied to the tumbler a fixed distance $x$ from the leading edge $a$ of the decoration in an area of the tumbler that is outside the decoration pattern. The mark $b$ then is visually put into alignment with a fixed line or bar 3 positioned below the ware by the operator of the next machine looking through the ware where it is transparent.

The peripheral distance $x$ from the beginning $a$ of the decoration to the registering mark $b$, in the direction the ware is screened, remains constant regardless of ware diameter. A cross section taken through the ware at 90° to its central axis indicates that the angle between the beginning of the decoration and the registering mark depends on the ware diameter. Because the fixed registering line 3 on the machine lies below the ware, the portion of the first decorating application to first come into contact with the screen would thus also depend on ware diameter. With the foregoing in view, the amount of misregistration can then be expressed as follows:

$$M = \frac{\pi}{2}(D_1 - D_2)$$

where $D_1$ is either the ideal ware diameter or actual ware diameter, whichever is larger, and $D_2$ is the smaller diameter.

To eliminate the shortcomings of the present registering system, this invention proposes that ware be marked automatically while in the first operation chuck (see FIG. 6), just prior to screening, by a device separate from that of the screen. The marking would take place in that area of the ware where the registering line marker or pointer 3 is present. Of particular concern are those situations in which the ware is in contact with the screen for substantially 360°. In this situation two registering marks are now printed by the screen. The direction of ware rotation during screening determines which of the two marks is to be used. Thus, ware rotated in a clockwise direction during the first screening operation frequently is rotated in a counter-clockwise direction during the second screening operation and again clockwise during the third screening operation, due to the random placing of ware along the handling conveyors and selection therefrom. This frequently results in poor registration of plural successive decorations because of the discrepancies of ware diameter in the screening area, as explained above.

By way of further explanation of the reason for applying the registering dot to the ware independent of the screen, reference should be had to FIGS. 4A, B and C; and FIGS. 5A, B and C. These figures show the two-step decoration of ware of an ideal size (FIGS. 4A and 5A), larger size (FIGS. 4B and 5B) and smaller size (FIGS. 4C and 5C). Assuming that the ware is decorated by the set-up shown in FIG. 4, it can be seen that ideal size ware (FIG. 4A) will have the registering dot $b$ applied $x$ distance from the leading edge $a$ of the decoration $d$. If the screen is made of the proper length the dot $b$ will be applied diametrically opposite to the point $a$. The second screening operation on this same piece of ware will apply the second decoration $e$ in registry with the first as long as it is applied in the same direction and starts at $a$ (see FIG. 5A). It will start at $a$ if the operator sets the dot $b$ in alignment with the pointer 3.

Looking next at FIGS. 4B and 5B, it can readily be seen that the first screening with the same length screen, as in the case of FIG. 4A, on slightly larger than ideal size ware results in the registering dot $b$ being printed less than half-way around the circumference of the ware.

This registering dot $b$ is then aligned with the pointer 3 by the next operator and the resulting second decoration $e$ will be out of registry by the amount $b$ (the registering dot) is displaced from a point diametrically opposite the point $a$.

With reference to FIGS. 4C and 5C, where the same decorating procedure is followed as in the previous examples, it can be seen that misregistration will always occur when screening ware having a smaller circumference than the ideal size of FIG. 4A, even though care is taken to screen in the same direction.

Turning now to FIGS. 6A, B and C, and FIGS. 7A, B and C, it will be apparent that the application of the registering dot $b$ by mechanism separate from the screen itself has a distinct advantage and results in providing plural, successively decorated ware in which the decorations, i.e., $d$ and $e$ are always in perfect registry.

As is the case with the previous FIGS. 4A–C and 5A–C, FIGS. 6A, B and C show ware of ideal, larger and smaller size respectively, with the first decoration applied. In every instance the registering dot or mark $b$ (schematically shown) is applied diametrically opposite the point $a$ which is the leading edge of the first screen decorating application. The registering dot is applied by the mechanism of FIG. 6, which is essentially the same as that of FIG. 4 with the addition of a dot applicator member, schematically shown at 4, of the type which is solenoid operated in the printing direction and spring returned by spring 5. The energization of the solenoid is controlled by a switch 6 which in turn is operated by the cam follower 7 and cam 8. The cam 8 has two lobes formed thereon and the cam is mounted on a shaft 9 which is driven by the screen printing mechanism (see FIG. 2).

It can thus be seen that with the registering dot applied to the ware at the first decorating station by mechanism which is separate from the screen, the placing of the ware in the subsequent screen decorating machine by the operator will result in the second screening being in registry with the first. This is illustrated in FIGS. 7A, B and C wherein there is shown the ware of FIGS. 6A, B and C with the second screening $e$ applied in accordance with the invention.

It is also apparent that all subsequent screenings must start their screening at point $a$ and the ware must rotate in the same direction as in the first screening. The method and apparatus for insuring such operation will be described in detail hereinafter.

It has been applicant's experience that ware decorated in the same direction in all operations registers better than ware decorated in both directions. This invention makes possible the simple identification of ware according to its direction of rotation during screening. Ware is identified, as to direction of rotation during screening, by signal lights mounted directly above the ware along the multiple lane conveyors, as shown in FIG. 1.

By way of explanation of this part of the invention, reference should be had to the drawings, and in particular, FIG. 1, which schematically shows the system of handling ware during the multiple decoration thereof.

The first decorating machine 10 is operated by the decorating operator positioned at 11 and as the machine operates to decorate either by clockwise or counter-clockwise rotation of the ware during screening, a series of bulbs 12, 13, 14 and 15 light in pairs depending upon the direction of rotation of the glassware. This apprises the operator of which lane the ware that has been decorated should be placed. It is only necessary that the operator place ware from the machine on the conveyor, in the lane indicated by the lighting of selected pairs of bulbs. For example, ware rotated in a clockwise direction during screening is placed in alternate lanes with respect to ware decorated in a counter-clockwise direction on the multiple lane conveyor 16. Inasmuch as the operator at position 11, who operates the first screen application by the machine 10, is not concerned with orienting glassware prior to its screening, but is only concerned with placing the ware in the proper rows or lanes on the conveyor 16 in relation to the direction of rotation of the ware by the screening, this operator can work at relatively fast speed. Therefore, lights 12 and 14, for example, will be lit after the machine has decorated the ware by clockwise rotation and the operator then places the ware which has been decorated by clockwise rotation under the illuminated bulb 12 or 14. When decorating the next piece of ware obviously the decorating machine will rotate the ware counter-clockwise and upon operation of the machine 10 in this manner the lights 13 and 15 will be illuminated and lights 12 and 14 turned off. In this manner the operator the has the option of placing the ware beneath the light 13 or 15. The speed of decorating which may be accomplished by the operator 11 is fairly rapid, thus the reason for having the ware located in four rows. It should be understood that all of the ware could be placed in just two rows in accordance with the direction of the rotation of the ware during the first screening.

The ware on the conveyor 16 passes through a drying oven 17 of the usual tunnel-type if it is necessary to dry the paint, and approaches the position of the second screen operators 18 and 19. The operators at 18 and 19 must orient the ware which they take from the conveyor 16 on their machines 20 and 21 respectively in a particular orientation so as to provide registration of the second decoration in relation to the first. Therefore, their operating speeds are approximately one-half as fast as the first operator 11.

The machines 20 and 21 each control a set of lights over the conveyor 16, which is the supply conveyor with respect to the second screening operation, and the conveyor 22, which is the outgoing conveyor. The machine 20 will operate the lights 23, 24, 25 and 26 in accordance with the attitude of the machine with respect to the direction of rotation which it will give to the ware on its next normal screen decorating operation. Thus the operator at 18 is required to select the ware from either of the two rows appearing under the lights 25 and 26, depending on which of the two lights is lit at the time the operator is to select the ware and place it in the machine 20 for decorating. It should be understood that the machine 20 controls the alternate energization of the light bulbs 25 and 26. After completion of the screen decorating operation by the machine 20, the operator places the ware on the conveyor 22 beneath the light bulb which is lit thereover. The first set of lights 27, 28, 29 and 30 positioned over the conveyor 22 will be illuminated in pairs alternately so as to provide a signal or indication to the operator 18 as to which of the two rows under the lights 29 or 30 the operator is to place the decorated ware. In a like manner the operator 19 is provided with a system of selecting ware from the conveyor 16 in accordance with the attitude of the machine 21 as indicated by the illumination of light 31 or 32, which lights will be illuminated alternately by the attitude of the decorating machine 21. In the same manner as the control function performed by the machine 20, the machine 21 will control the alternate illumination of the lights 33 and 34 positioned over the outgoing conveyor 22 running adjacent the machine 21. This provides the operator 19 with a visual indication as to which line the ware is to be placed relative to bulbs 33 or 34 over the conveyor 22.

The conveyor 22 carries the ware having the second decoration thereon through a drying oven 35, when it is necessary to dry the paint, where the decoration is dried to the extent necessary to permit a further decoration without danger of smearing the previous decorations.

The third decoration is applied to the ware by operators at 36 and 37 with the machines 38 and 39 respectively. The operators 36 and 37 select ware from the conveyor 22 in accordance with the lighted light bulbs 40–43 positioned over the conveyor. For example, operator 36 is required to select ware from beneath the light bulb 40 or 41, depending on which bulb is lit, it being understood that the energization of bulbs 40 and 41 are controlled by the operation of the machine 38. In the same manner the operator 37 is informed as to the proper selection of ware in accordance with the illumination of either the light bulb 42 or bulb 43. The bulbs 42 and 43 are alternately lit under the contol of the machine 39 depending upon the attitude of the machine. Inasmuch as the operators 36 and 37 are applying the last decoration to the ware, it is unnecessary that they segregate the ware on the flight conveyor 44 which will carry the ware to a paint firing oven where the decorations are fused on the glassware.

Figure 2:
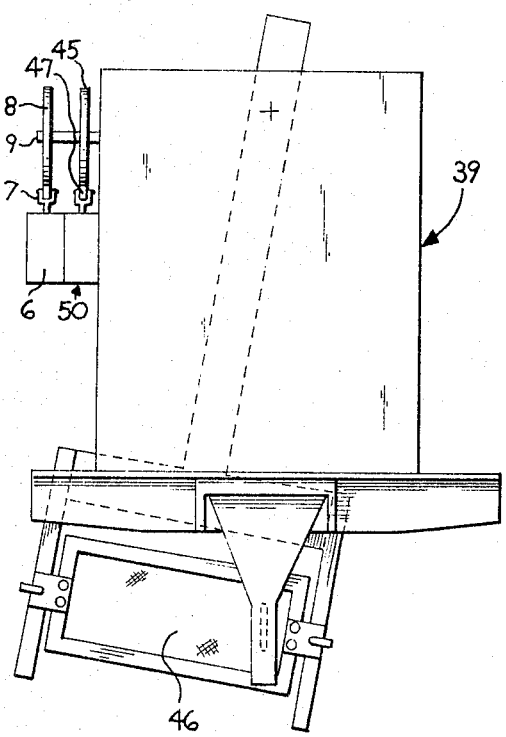
FIG. 2 is a schematic plan view of a silk screen decorating machine of the type used in the invention.
Figure 3:
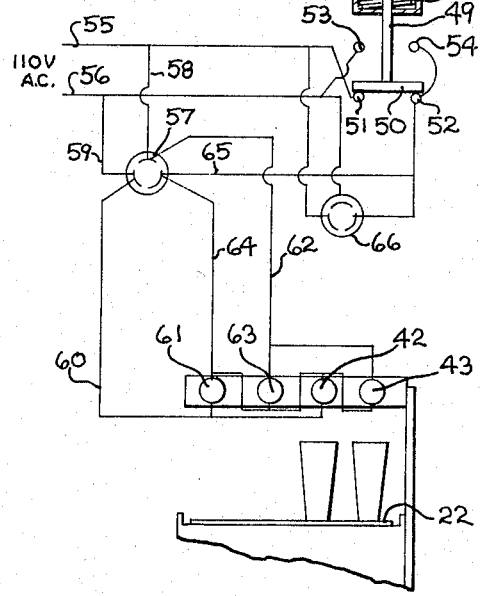
FIG. 3 is a schematic circuit diagram illustrating the signaling or indicating system of the invention.

Referring now to FIGS. 2 and 3, there is schematically shown the manner in which the individual screen decorating machines control the illumination of the signal lights mounted over the conveyors.

FIG. 2 shows a schematic top plan view of a typical two-way screen decorating machine of the type which is intended to apply a screen decoration by frictional engagement with the ware to rotate the ware in either a clockwise or counter-clockwise direction, it being understood that one direction provides one decoration to a first tumbler and the machine, in its normal operation, will decorate a second tumbler by movement of the screen in the opposite direction. Details of such a machine may be found in Bauman Patent No. 2,304,725. The only additional element added to the Bauman device is a pair of switching cams. The cam 8 and its function have already been explained in connection with the registering dot application. As shown in FIG. 2, a cam 45 is connected to the screen oscillating drive shaft 9 so that the cam 45 makes one 360° revolution when the screen 46 moves, for example, from the position shown in FIG. 2 to the right and returns. A cam follower 47 is in engagement with the surface of the cam 45 and is biased thereagainst by a spring 48.

With particular reference to FIG. 3, it can be seen that the follower 47 is connected by a rod 49 to a switch element 50. As shown in FIG. 3, the switch 50 is in the position of closing a pair of contacts 51 and 52. Upon rotation of the cam 45 to the position where the radius of the cam is less, the switch 50 will move upwardly and operate to close contacts 53 and 54. As will later be explained, this alternate connection of the switch element 50 to the contacts 51 and 52 or 53 and 54 serves to control the illumination of the lights positioned over the conveyor.

A pair of leads 55 and 56 are supplied with 110 volt, alternating current with the lead 55 connected to contact 51 and lead 56 connected to contact 53. A three-prong plug 57 has two of its sockets connected by leads 58 and 59 to the leads 55 and 56 respectively. The lead 59 is connected through plug 57 to a lead 60 which extends to one side of two light bulbs 61 and 42. The lead 58 likewise is connected by a lead 62 to the two light bulbs 63 and 43. A common return lead 64 is connected to the opposite terminal of all the light bulbs 42, 43, 61 and 63 and to the third connection of the socket 57 which in turn is connected by a lead 65 to the two switch contacts 54 and 52. An alternate socket 66 is connected to the leads 55 and 56 and serves as a phase changing plug in the event the signal lights controlled by one machine are out of phase with the signal lights controlled by another machine.

It can readily be seen that as the cam 45 of the machine 39 is rotated in step with the operation of the drive for screen 46, that the switch 50 will alternate in its connection to contacts 53, 54 and 51, 52; thus alternating the illumination of the pairs of signal lights 61, 42 and 63, 43.

It should be understood that each of the machines 10, 20, 21 and 38 have the same signal light circuit arrangement as that shown schematically with respect to machine 39 and thus each machine will control the illumination of its signal lights in accordance with the attitude of the machine with respect to clockwise or counter-clockwise rotation of the tumblers which are decorated.

In this manner the various operators of the semi-automatic screen decorating machines utilized to apply plural registered screen decoration to glassware such as tumblers are quickly and easily apprised of the ware which they are to select from the next operation of their machine and also are apprised of how they are to segregate the ware that they have already decorated.

Other and further modifications will be apparent to those skilled in the art to which the invention pertains without departing from the spirit and scope of the appended claims.

I claim:

1. In the method of applying plural screen decorations to plural articles of glassware having slighly varying circumferences wherein each article is given successive, registered, screen decorations and the screening effects rotation of the articles by lateral movement of the screen in contact with the article and further wherein the screen is moved in one direction to screen one of the articles and in the opposite direction to screen the next succeeding article whereby alternate articles are rotated in opposite directions, comprising the steps of screening successive articles of circular cross-section at a first station, manually segregating those articles which were rotated in said one direction from those which were rotated in the opposite direction, moving the segregated ware from the first station to a second station, manually selecting those articles which were rotated in said one direction for decorating at said position in the same direction as that in which the first decoration was applied, further manually selecting those articles which were rotated in said second direction for decorating at said second station in the same direction as that in which the first decoration was applied, and applying a third decoration to said articles in the same manner in which the first and second decorations were applied to the articles.

2. The method of applying successive decorations as defined in claim 1 in which an identification mark is applied to each article at a point spaced circumferentially from and in a specific angular relationship with respect to the leading edge of the decoration applied at the first station, manually positioning said mark with respect to a mark on a screen at the second station thereby accurately to position said leading edge for decorating at the second station.

3. The method defined in claim 2 in which the identification mark is applied at a point diametrically opposite said leading edge.

References Cited by the Examiner
UNITED STATES PATENTS

| | | | |
|---|---|---|---|
| 1,594,590 | 8/1926 | Bates | 101—129 |
| 2,150,522 | 3/1939 | Shurley et al. | 101—426 |
| 2,469,671 | 5/1949 | Warde | 101—129 |
| 2,885,957 | 5/1959 | Hansen | 101—124 |
| 2,925,030 | 2/1960 | Johnson | 101—115 |
| 3,086,458 | 4/1963 | Shafer | 101—115 |
| 3,096,709 | 7/1963 | Eldred et al. | 101—115 |

ROBERT E. PULFREY, *Primary Examiner.*

DAVID KLEIN, N. A. HUMPHRIES, W. F. McCARTHY, *Assistant Examiners.*